(12) United States Patent
Vacca et al.

(10) Patent No.: US 12,722,475 B2
(45) Date of Patent: Sep. 1, 2026

(54) FRAME FOR A DEVICE FOR REGULATING THE AIR INTAKE OF A VEHICLE

(71) Applicant: VALEO SYSTEMES THERMIQUES, La Verriere (FR)

(72) Inventors: Frederic Vacca, La Verriere (FR); Juan-Carlos De Francisco, Saragossa (ES)

(73) Assignee: Valeo Electrification, Cergy Pontoise (FR)

( * ) Notice: Subject to any disclaimer, the term of this patent is extended or adjusted under 35 U.S.C. 154(b) by 632 days.

(21) Appl. No.: 18/245,555

(22) PCT Filed: Sep. 3, 2021

(86) PCT No.: PCT/EP2021/074428
§ 371 (c)(1),
(2) Date: Mar. 16, 2023

(87) PCT Pub. No.: WO2022/058185
PCT Pub. Date: Mar. 24, 2022

(65) Prior Publication Data

US 2023/0364985 A1 Nov. 16, 2023

(30) Foreign Application Priority Data

Sep. 17, 2020 (FR) ....................................... 2009400

(51) Int. Cl.
*B60K 11/08* (2006.01)
*F01P 7/10* (2006.01)

(52) U.S. Cl.
CPC .............. *B60K 11/085* (2013.01); *F01P 7/10* (2013.01)

(58) Field of Classification Search
CPC ....... B60K 11/085; B60K 11/06; B60K 11/00; B60K 11/08; F01P 7/10; F01P 7/02; F01P 7/00
See application file for complete search history.

(56) References Cited

U.S. PATENT DOCUMENTS

| | | | | |
|---|---|---|---|---|
| 4,462,304 A * | 7/1984 | Hashimoto | ............. | F24F 13/15 454/285 |
| 7,757,643 B2 * | 7/2010 | Harich | ................ | B60K 11/085 123/41.04 |

(Continued)

FOREIGN PATENT DOCUMENTS

| | | |
|---|---|---|
| CN | 110758306 A | 2/2020 |
| GB | 2108263 A | 5/1983 |
| WO | 2015032990 A1 | 3/2015 |

OTHER PUBLICATIONS

European Patent Office, International Search Report (w/English translation) and Written Opinion of corresponding International Application No. PCT/EP2021/074428, dated Jan. 18, 2022.

*Primary Examiner* — James M Dolak
(74) *Attorney, Agent, or Firm* — Valeo Electrification

(57) ABSTRACT

A frame for an air intake regulating device of a vehicle, including at least two walls participating in defining an opening zone for receiving a set of movable flaps arranged parallel to one another, at least one movable flap being movable in rotation about at least one pivot axis, at least one bearing supported by an elastically deformable tab, the bearing being configured to receive a pin participating in defining the pivot axis of the movable flap, the tab being delimited in a wall of the frame by a U-shaped groove, the groove including a base and two arms respectively extending an end of the base, each of the arms having a free end opposite the base. The groove includes a clearance zone positioned at one of the free ends of the arms of the groove, (Continued)

the clearance zone laterally extending the corresponding arm while forming at least one protuberance.

20 Claims, 5 Drawing Sheets

(56) References Cited

U.S. PATENT DOCUMENTS

| | | | | |
|---|---|---|---|---|
| 8,500,528 | B2 * | 8/2013 | Leonhard | F24F 13/15 454/336 |
| 8,505,660 | B2 * | 8/2013 | Fenchak | B60K 11/085 180/68.1 |
| 8,550,887 | B2 * | 10/2013 | Walters | F01P 7/10 454/155 |
| 8,752,886 | B2 * | 6/2014 | Wirth | B60K 11/085 296/193.09 |
| 9,233,605 | B2 * | 1/2016 | Hijikata | B60K 11/085 |
| 9,447,719 | B2 * | 9/2016 | Kiener | F28F 27/02 |
| 9,533,565 | B2 * | 1/2017 | Elliott | B60K 11/085 |
| 9,758,031 | B2 * | 9/2017 | Edwards | B60K 11/085 |
| 9,987,919 | B2 * | 6/2018 | Knauer | B60K 11/085 |
| 10,093,172 | B2 | 10/2018 | Yoo et al. | |
| 10,100,707 | B2 * | 10/2018 | Wolf | B60K 11/085 |
| 10,906,389 | B2 * | 2/2021 | Herlem | B60K 11/085 |
| 11,167,636 | B2 * | 11/2021 | Morita | F01P 11/20 |
| 11,413,956 | B2 * | 8/2022 | Gerber | B60K 11/085 |
| 11,987,116 | B2 * | 5/2024 | Müller | B60R 19/52 |
| 12,337,676 | B2 * | 6/2025 | Müller | F01P 7/10 |
| 12,377,724 | B2 * | 8/2025 | Göbel | B60K 11/085 |
| 12,479,288 | B2 * | 11/2025 | Byun | B60K 11/04 |
| 12,485,744 | B2 * | 12/2025 | Pütz | B60K 11/085 |
| 12,485,745 | B2 * | 12/2025 | Kumar | B60K 11/085 |
| 12,508,897 | B2 * | 12/2025 | Yoon | B60K 11/085 |
| 12,528,348 | B2 * | 1/2026 | Singh | B60K 11/085 |
| 12,583,312 | B2 * | 3/2026 | Tsai | B60K 11/085 |
| 2016/0207394 | A1 * | 7/2016 | Vacca | B60K 11/085 |
| 2019/0210451 | A1 * | 7/2019 | Parra | B60K 11/085 |
| 2021/0023937 | A1 * | 1/2021 | Gerber | B60K 11/085 |

* cited by examiner

FRAME FOR A DEVICE FOR REGULATING THE AIR INTAKE OF A VEHICLE

TECHNICAL FIELD

The present invention concerns the field of cooling an engine of a motor vehicle, and more particularly the field of devices for regulating the air intake into an engine compartment, in particular at the front end of a vehicle.

BACKGROUND OF THE INVENTION

Grilles at the front face of the motor vehicle are known to be equipped with an air intake regulating device, which comprises a plurality of movable flaps, control of which allows opening or closure of the air access to an engine compartment. These air intake regulating devices can be designated by the acronym AGS or active grille shutter. To this end, the grille comprises at least one frame in which the movable flaps are pivotably mounted.

When the flaps are in the closed position, they obstruct the opening of the passage provided in the grille and the air does not penetrate inside the engine compartment. This closed position, which is used in particular when the cooling needs of the engine are limited, allows a reduction in the coefficient of drag and thus allows a reduction in fuel consumption and $CO_2$ emissions. When the flaps are set to the open position, the air can circulate through the grille via the air intake and help cool the engine of the motor vehicle.

The frame supporting the movable flaps is fixed to the grille and comprises bearings, each of which receive a pin helping to define a pivot axis of one of the movable flaps. Conventionally, these bearings each have a U-shape open towards a face of the frame, the movable flaps being mounted in their respective bearing(s) from this face of the frame. In particular, the opening of the U-shaped bearings is turned towards the front of vehicles, and these flaps are inserted in the frame from the front face of the frame, i.e. a face of the frame facing away from the engine compartment once in position in the vehicle. To allow insertion of the flaps in the bearings, in particular in a direction perpendicular to a main extension plane of the frame, the tabs undergo an elastic deformation by pivoting about a flexion axis from a rest position to a working position. Once the flaps are mounted on the frame, each tab resumes its initial rest position.

The production tolerances of the frame and the flap mountings, and the mounting play of the flaps on the frame, can lead to variable forces on the tabs during insertion of the flaps. Thus when mounting a flap on the frame, an excessive deformation of the tab can occur beyond the limit of elastic deformation of the tab, which can lead to plastic deformation and irreversible modification of the shape of the tab, or in extreme cases to breakage of the tab.

In this context, the present invention proposes an alternative to the existing solutions in the form of a frame designed for optimum distribution of the force exerted on the tab during mounting of the flap on the frame.

SUMMARY OF THE INVENTION

The main object of the present invention is thus a frame for an air intake regulating device of a vehicle, the frame comprising at least two walls participating in defining at least one opening zone for receiving a set of movable flaps arranged parallel to one another, at least one movable flap being movable in rotation about at least one pivot axis, the frame further comprising at least one bearing supported by an elastically deformable tab, the bearing being configured to receive a pin participating in defining the pivot axis of the movable flap, the tab being delimited in a wall of the frame by a U-shaped groove, the groove comprising a base and two arms respectively extending an end of the base, each of the arms having a free end opposite the base. According to the invention, the groove comprises at least one clearance zone positioned at one of the free ends of the arms of said groove, said clearance zone laterally extending the corresponding arm while forming at least one protuberance.

What is meant by an "elastically deformable tab" is a tab capable of resuming its initial position after having undergone a mechanical deformation. Advantageously, this elastically deformable tab is deformed to allow insertion of the pin of the movable flap in the bearing carried by said tab, and its return to the initial position then fixes the position of the pin of the movable flap in the bearing. Thus the movable tab can move by flexion between a first tab position, corresponding to its initial position before mounting of the set of movable flaps and after mounting of the set of movable flaps on the frame, and a deformed position in which the tab allows passage during insertion of the movable flaps so they can be mounted on the frame. The tab moves from the first position to at least one second position, during mounting of at least one movable flap on the frame, by pivoting about the flexion axis, then from the at least one second position to the first position once the movable flap is mounted on the frame.

According to one embodiment, the tab is movable around a hinge arranged between the two movable ends.

In particular, the tab can be arranged in its initial position substantially in the plane of the frame wall on which the tab is articulated, and the tab extends into its deformed position in a plane intersecting the plane of said frame wall. The tab is thus able to flex around a hinge formed by a strip of frame material at the junction between the tab and the frame wall on which the tab is articulated. The flexion axis and the associated hinge are defined by the ends of the arms of the groove and by the clearance zone(s) respectively positioned at one of the free ends of the arms of the groove.

The clearance zone comprises a local increase in dimensions of the groove so as to form a protuberance when viewing the groove, or a hollow when viewing the material of the wall in which said groove is made, and in general a local modification of the profile of the edge delimiting the groove. It should be noted that this local increase is situated at the articulation hinge of the tab, i.e. in the zone in which the deformation stresses exerted on the material are greatest. These stresses being applied mainly to the edges delimiting the groove, the formation of a clearance zone allows an increase in the perimeter of the form defined by the free end of the arms of the groove, or in other words, the length of the edges delimiting this groove, so as to distribute the stresses exerted on flexion of the tabs over a larger area. Such a distribution allows a reduction in the peak stresses and avoids weakening the material at the hinge, i.e. avoids the material undergoing plastic deformation.

According to an optional characteristic of the invention, at least one arm extends axially in a median extension plane of the arm, perpendicular to the wall in which the groove is delimited, said arm having a mean lateral dimension perpendicular to the extension plane of a first determined value, wherein the clearance zone positioned at the free end of this arm has a lateral dimension perpendicular to said extension plane of a second value greater than said first determined value.

According to an optional characteristic of the invention, the hinge has a lateral dimension, perpendicular to the median extension plane of the arm, of a third determined value. Preferably, said third value is greater than the first value and second value. The "lateral dimension" of the hinge is the shortest distance between a clearance zone positioned at the end of an arm and the arm opposite the groove, or where applicable the shortest distance between the two clearance zones of a same groove, respectively positioned at an end of one of the arms of this groove. The dimension is described as lateral in that it is substantially parallel to the direction perpendicular to the median extension plane of an arm, along which the mean lateral dimension of an arm or clearance is defined, as described above.

According to an optional characteristic of the invention, the clearance zone is centred on the median extension plane of the arm, forming two lateral protuberances of the arm which are substantially symmetrical relative to said extension plane. In other words, the clearance zone has substantially the form of a circle, a diameter of which lies in the median extension plane of the arm, at the free end of which the clearance zone is positioned.

According to an optional characteristic of the invention, the clearance zone has an asymmetric profile relative to the median extension plane of the arm, the protuberance extending from the free end of the corresponding arm opposite the other arm of the groove. In other words, the clearance zone positioned at a free end of an arm of the groove can be defined firstly by a straight edge arranged in the extension of an edge delimiting the arm, and more particularly an internal edge facing the other arm, and secondly a concave edge which generates a curved form of the groove facing away from the other arm of the groove.

According to an optional characteristic of the invention, the second value representative of the lateral dimension of the clearance zone is substantially 1.5 to 4 times, preferably from 1.5 to 2.5 times the first value representative of the mean lateral dimension of the arm, at the free end of which the clearance zone is positioned, and/or substantially of the order of 2 to 6 times, preferably 3 to 5 times less than the lateral dimension of the hinge.

The first ratio between the clearance zone and the arm ensures that the increase in the perimeter of the edges delimiting the groove in the clearance zone is sufficient for a correct distribution of the stresses, and the second ratio between the clearance zone and the hinge ensures that the modification in shape of the groove does not adversely affect the dimension of the hinge, and the tab can be correctly articulated on the frame.

According to an optional characteristic of the invention, the second value representative of the lateral dimension of the clearance zone is between 4 and 8 mm, preferably between 4 and 6 mm, the first value representative of the mean lateral dimension of the arm is between 2 and 3 mm, and the lateral dimension of the hinge is between 15 and 25 mm.

According to an optional characteristic of the invention, the clearance zone axially extends the corresponding arm via a junction zone of curved profile.

According to an optional characteristic of the invention, the profile of the protuberance formed by the clearance zone in the plane of the wall of the frame is a circle portion.

The clearance zone can in particular take the form of a "water droplet", with a clearance zone having mainly a circular form and a portion thinning out as it approaches one of the arms of the groove.

According to an optional characteristic of the invention, the groove comprises a first clearance zone positioned at the end of one of the arms of the groove, and a second clearance zone positioned at the end of the other arm of the groove, the two clearance zones being symmetrical to one another relative to a median extension plane of the tab, perpendicular to the plane in which the corresponding frame wall extends. In other words, the groove comprises a clearance zone at each end of these arms, and these clearance zones have an equivalent profile so as to ensure that when the tab flexes, the flexion stresses are well distributed between the two free ends of the arms of the groove.

The invention also concerns a device for regulating the air intake of a vehicle, comprising at least one frame as claimed in any of the preceding claims, and an actuator for actuating a set of movable flaps.

The actuator allows the movable flaps to move from an open position to a closed position, and vice versa.

BRIEF DESCRIPTION OF DRAWINGS

Other features, details and advantages of the invention will become clearer on reading the description set out below, together with several embodiments provided purely as examples and by way of indication, with reference to the attached schematic drawings, in which.

DETAILED DESCRIPTION OF THE INVENTION

The features, variants and different embodiments of the invention can be combined with one another, in various combinations, provided that they are not mutually incompatible or exclusive. In particular, it is possible to imagine variants of the invention that comprise only a selection of features described below, independently of the other characteristics described, if this selection of features is sufficient to confer a technical advantage and/or to differentiate the invention from the prior art.

In the figures, the terms longitudinal, transverse, lateral, left, right, above and below refer to the orientation, with reference to a trihedron L, V, T, of a vehicle integrating an air intake regulating device 100 according to the invention. Within this frame of reference, a longitudinal axis L represents a longitudinal direction, a transverse axis T represents a transverse direction perpendicular to the longitudinal direction, and a vertical axis V represents a vertical direction of the object in question, this vertical direction being perpendicular to the longitudinal direction and the transverse direction. According to the orientation given in the figures, the longitudinal direction is parallel to a main movement direction of a vehicle integrating the air intake regulating device according to the invention, and the vertical direction corresponds to a direction perpendicular to the road along which the vehicle is moving, the transverse direction corresponding to a direction parallel to a transverse axis along which largely extends a flap of the intake regulating device, as will be described in more detail below. Furthermore, it should be noted that a dimension measured along an axis parallel to the longitudinal axis will be designated as “length”, a dimension measured along the transverse axis will be designated as “width”, and a dimension measured along the vertical axis will be designated as “height”.

Figure 1:
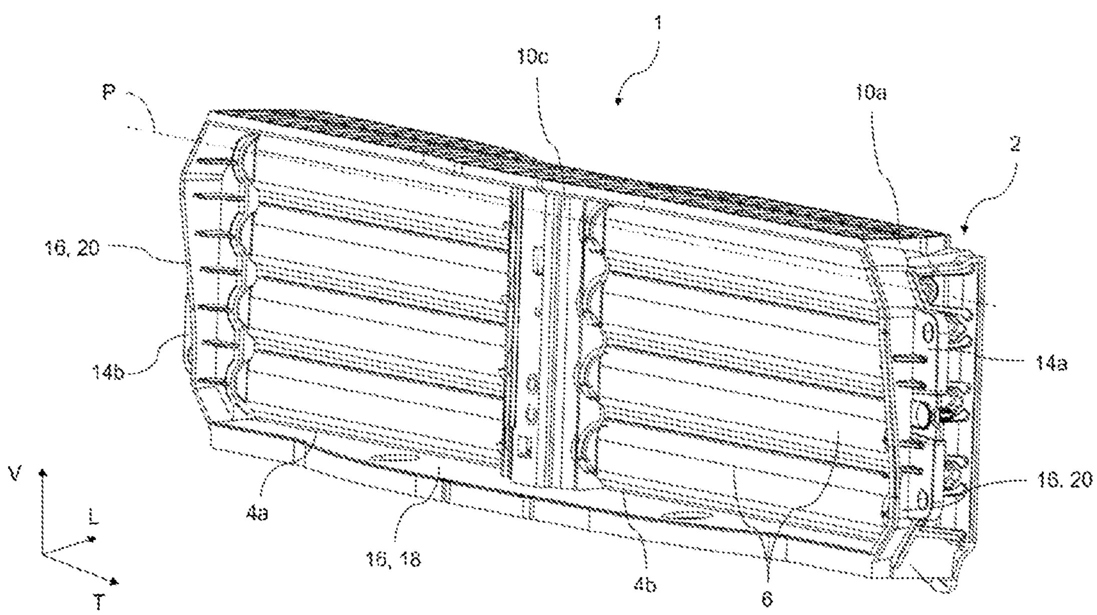
FIG. 1 is a perspective view of an air intake regulating device of a vehicle according to the invention, showing a front face of the device facing the front of the vehicle.
Figure 2:
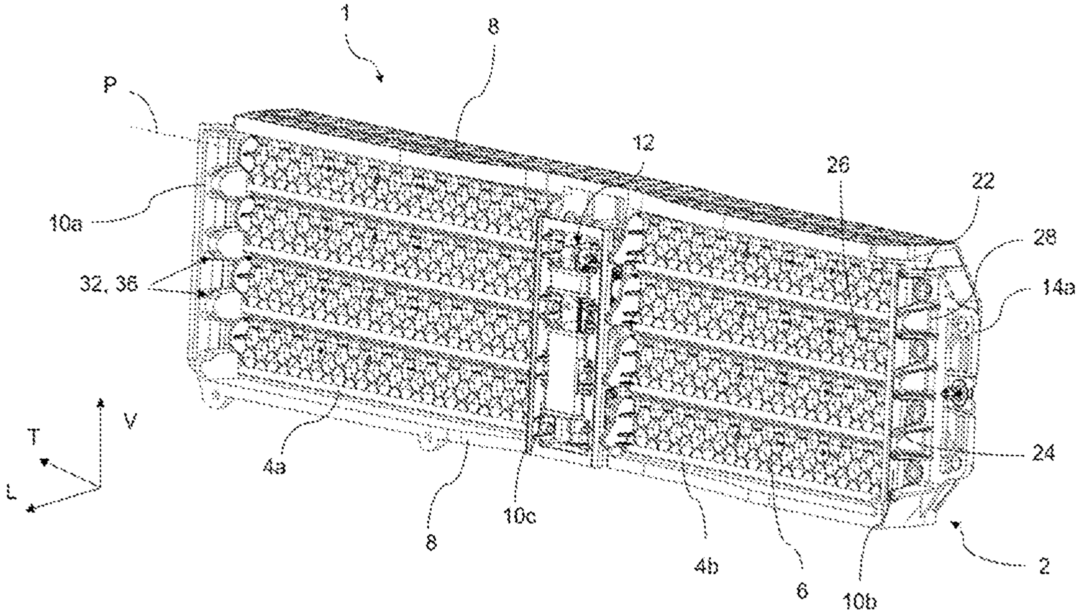
FIG. 2 is a perspective view of the air intake regulating device from FIG. 1, in a perspective angle which here shows the rear face of the device designed to face towards an engine block of the vehicle.

FIG. 1 shows an air intake regulating device 1 at the front end of the vehicle, said device 1 being viewed from the front of the vehicle. The “front” of the vehicle is defined according to the normal travel direction of the vehicle when travelling along a road, i.e. the air intake regulating device 1 is here observed from a grille of the vehicle in which said device is integrated. The same air intake regulating device 1 at the front face of the vehicle is also shown in FIG. 2, said device 1 being viewed from the rear of the vehicle. The “rear” of the vehicle is defined according to the normal travel direction of the vehicle when travelling along a road, i.e. the air intake regulating device 1 is here observed from the engine of the vehicle for example.

The air intake regulating device 1 is configured in particular to guide the air from outside the vehicle towards an engine and/or any other part of the vehicle requiring cooling by external air.

For this, the air intake regulating device 1 comprises at least one frame 2 defining at least one opening zone 4*a*, 4*b* able to receive a set of movable flaps 6. According to the example illustrated in FIGS. 1 and 2, the frame 2 more particularly defines two opening zones 4*a*, 4*b* in which two sets of movable flaps 6 are mounted. As shown, the movable flaps 6 of a same set mounted in one of the opening zones 4*a*, 4*b* are arranged next to one another vertically and each extend in a transverse direction.

At least one movable flap 6 can assume an open position in which it allows entry of an external air flow into the vehicle, or a closed position in which it prevents this external air flow from entering the vehicle. In other words, a movable flap 6 in the open position extends largely in a horizontal plane, i.e. a plane containing the longitudinal axis L and transverse axis T, and this same flap in closed position extends largely in a vertical plane containing the transverse axis T and vertical axis V. Advantageously, each of the movable flaps 6 is adapted to assume these open or closed positions, and the movable flaps are arranged at a distance from one another such that when they all assume a closed position, the corresponding opening zones are sealed. On FIGS. 1 and 2, the movable flaps 6 are all in a closed position i.e. they do not allow passage of an external air flow to the engine of the vehicle.

At least one movable flap 6, advantageously each of the movable flaps 6, is movable in rotation around a pivot axis P. As shown, this pivot axis P is parallel to the transverse axis T of the illustrated trihedron. According to the invention and as will be described in more detail below, at their pivot axes, the movable flaps 6 are mounted on the frame via bearings carried by tabs formed on the frame 2.

According to the example illustrated, the two opening zones 4*a*, 4*b* defined by the frame 2 are more particularly each defined by at least two transverse walls 8 of the frame 2 and at least two vertical walls 10 of said frame 2. The term “transverse wall” means a wall, which extends primarily along an axis parallel to the transverse axis T, and a “vertical wall” means a wall, which extends primarily along an axis parallel to the vertical axis V.

More particularly, the frame 2 comprises two outer vertical walls 10*a*, 10*b* and a central vertical wall 10*c* situated between the two outer vertical walls 10*a*, 10*b* along the transverse axis T and common to both opening zones 4*a*, 4*b* delimited by the frame 2. This central vertical wall 10*c* forms a housing for an actuator 12, shown on FIG. 2 and able to actuate the movable flaps 6, i.e. to allow the transfer of these movable flaps 6 from their closed position to the open position and vice versa, according to the instructions received.

The frame 2 also comprises at least one fixing flange 14 adapted to allow the fixing of the frame 2, and consequently the movable flaps 6 carried by this frame 2, onto the vehicle. In the example illustrated, the frame 2 comprises more particularly at least two fixing flanges, a first fixing flange 14*a* carried by a first outer vertical wall 10*a* which participates in defining a first opening zone 4*a*, and a second fixing flange 14*b* carried by a second outer vertical wall 10*b* which participates in defining a second opening zone 4*b*. The first fixing flange 14*a* and the second fixing flange 14*b* respectively extend away from the movable flaps 6 received in the first opening zone 4*a*, and away from the movable flaps 6 received in the second opening zone 4*b*. In other words, each of the fixing flanges 14*a*, 14*b* extends from one of the first or second outer vertical walls 10*a*, 10*b* away from the central vertical wall 10*c*.

According to an exemplary embodiment of the invention, the frame 2 can be produced by an injection molding process, and the elastically deformable tabs carrying the above-mentioned bearing can be produced integrally with the frame during this molding.

According to the example illustrated, the frame 2 is advantageously extended forward by an air guidance element 16 which guides the air between the grille and the frame, being arranged around the entire periphery of the frame. As illustrated, this air guidance element 16 borders the first opening zone 4*a* and the second opening zone 4*b* and is continuous between the two opening zones 4*a*, 4*b*. This air guidance element 16 thus comprises at least two transverse edges 18 connected together by at least two vertical edges 20. This air guidance element 16 can be separate and attached to the frame 2 by any known fixing components, or be made of the material of the frame 2, i.e. the frame 2 and the air guidance element 16 then form a single component which cannot be separated without destruction of the frame 2 or air guidance element 16.

As stated above, at least one of the movable flaps 6, advantageously all movable flaps 6, is movable in rotation around the transverse pivot axis P implemented by at least one pin integral with the flap which is received in at least one bearing 22 formed on the frame 2.

At least one bearing 22 is carried by at least one elastically deformable tab 24. The term “elastically deformable” means a tab configured to resume an initial position after having undergone a mechanical deformation, in particular a deformation by flexing around a hinge, as is the case in the illustrated example. In the description which follows, the term “tab 24” can also refer to an elastically deformable tab 24. Furthermore and unless specified otherwise, the term “tabs 24” can refer to each of these elastically deformable tabs 24 formed on the frame 2.

As evident more particularly on FIG. 2, each tab 24 is configured to form a bearing 22 for receiving a pivot pin of a movable flap, and the frame 2 comprises as many tabs 24 as movable flaps 6. The tabs 24 are in particular arranged at the outer vertical walls 10*a*, 10*b* of the frame 2. In an alternative, the central vertical wall 10*c* can also comprise a set of elastically deformable tabs 24, each carrying a bearing 22 receiving a pivot pin of a movable flap.

Figure 3:
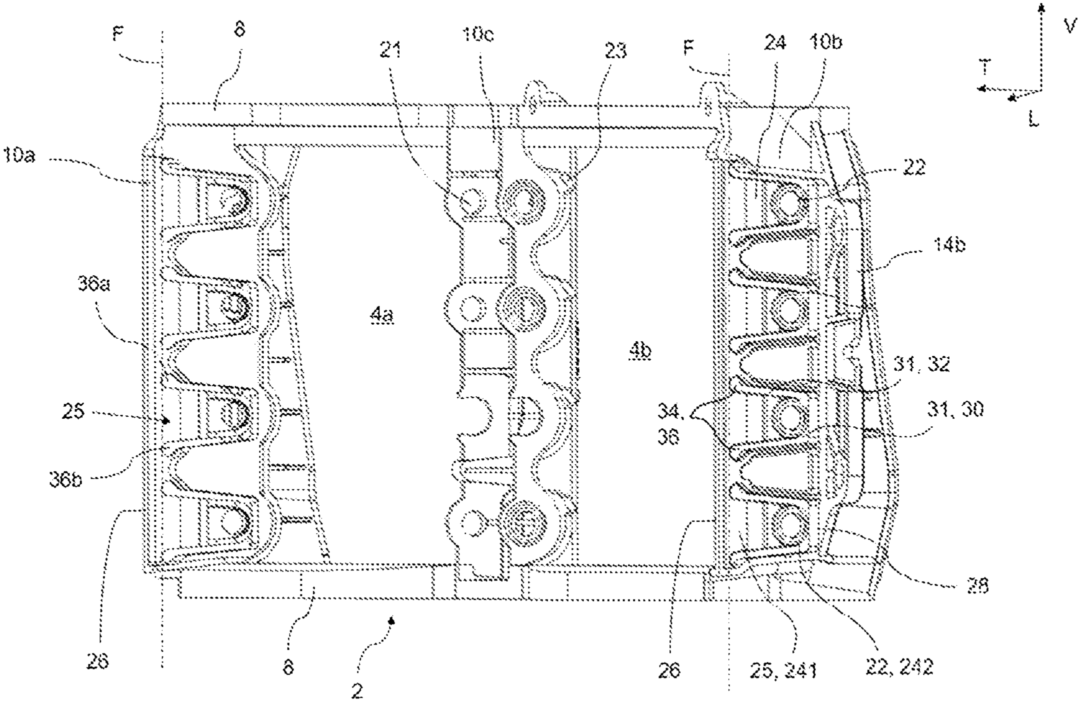
FIG. 3 is a perspective view of a frame of the air intake regulating device from a perspective angle similar to that of FIG. 2.

FIG. 3 shows more clearly the tabs 24 which carry a bearing 22. In the example illustrated here, each outer vertical wall comprises four tabs 24, each carrying a bearing 22. The tabs 24 arranged on the first outer vertical wall 10*a* extend in a first main extension plane of the first outer vertical wall 10*a*, and the tabs 24 arranged on the second outer vertical wall 10*b* extend in a second main extension plane of the second outer vertical wall 10*b*, these main extension planes being substantially parallel to the longitudinal axis L and vertical axis V.

The description below concerns only one of these tabs 24. Since the tabs 24 in the example illustrated are identical to one another, this description of one of them applies mutatis mutandis to the others. Similarly, the references shown on one of these tabs 24 can be directly transposed to the others.

The tab 24 extends mainly longitudinally along the longitudinal axis L from a rear face of the frame to a face of the frame, having a first end 241 arranged close to a rear longitudinal edge 26 of the corresponding outer vertical wall, and a second end 242 arranged close to a front longitudinal edge 28 of the corresponding outer vertical wall, wherein the terms “front” and “rear” refer to the arrangement of the frame relative to the direction of travel of the vehicle along the longitudinal axis L.

The first end 241 forms the end of this tab 24 via which it is articulated on the frame 2. More particularly, this first end 241 takes the form of a hinge 25 which connects the tab 24 to the frame, here to one of the outer vertical walls 10*a*, 10*b* of the frame 2. The second end 242 carries the bearing 22 intended to receive a pin defining the pivot axis of one of the movable flaps.

The bearing 22 is here closed and comprises a through bore formed in the tab 24, the bore having a dimension substantially equal to the diameter of the pin, forming pivot component of the movable flap intended to be mounted on this bearing. It will be understood that this embodiment of a bearing is not limitative of the invention, and that the bearing could have an open form, which can be associated with a covering to prevent the detachment of the pivot pin once placed in the bearing.

The tab 24 is elastically deformable such that it is able to flex around an axis formed by the hinge in order to assume a deformed position in which it is moved away from the closest opening zone to allow passage of a movable flap, and be able to return to its original position in which the movable flap is captive in the bearing carried by the tab. It is understood that the original position thus comprises a rest position of the tab before any stress is exerted thereon during insertion of a movable flap, and also a working position in which the movable flaps are held in position on the frame with only one degree of freedom in rotation.

The tab 24 can move from one position to the other and shift relative to the frame wall on which it is articulated, firstly because of the thickness of the material, in particular at the hinge, and because of the material selected, here for example a glass-fibre-charged polypropylene type PPGF 30, and secondly because of the presence of a material cutout formed in the frame around the tab. In other words, the tab 24 is delimited relative to the frame 2 by a groove formed in the corresponding frame wall, allowing flexion of the tab 24 relative to the frame, this groove 31 forming said above-mentioned material cutout.

In the example illustrated here, at least one opening 21 is formed in the central vertical wall 10*c* facing a bearing 22 carried by a tab 24 as just described. More particularly, it is noted that a plurality of openings 21 is formed in the central vertical wall, each opening being formed vertically facing one of the bearings 22. The term “formed vertically facing” means that the opening and the bearing concerned are aligned relative to one another along the transverse axis T. In other words, each opening 21 is able to receive a component defining the pivot axis of one of the movable flaps, this pivot axis being also defined by a component, here a pin, received in the bearing 22 facing the opening 21 concerned. In this context, a first component arranged at a first transverse end of the movable flap and defining the pivot axis concerned is inserted in one of the openings 21, then the movable flap is pivoted such that a second transverse end of this movable flap, more particularly the pin participating in defining the pivot axis, can come into contact with the flexible tab 24 formed facing said opening 21 and deform this until said pin comes to be housed in the bearing 22.

According to an exemplary embodiment which is not shown here, the central vertical wall 10*c* can have a structure similar to the structure of the outer vertical wall and thus comprise a plurality of elastic tabs, each equipped with a bearing arranged facing another bearing formed on one or the other of the outer vertical walls, each of the bearings being adapted to receive a pin defining the pivot axis of one of the movable flaps. In this exemplary embodiment (not shown), each flap can advantageously be mounted by a purely translational movement in the longitudinal direction, the component participating in defining the pivot axis at each transverse end of the movable flap concerned being inserted simultaneously in two mutually facing bearings.

Finally, we see on FIG. 3 the presence, on at least one vertical wall of the frame 2, of at least one stop element 23 formed by a transverse protrusion of said vertical wall in the direction of the nearest opening zone. In the example illustrated, a stop element 23 is formed substantially in the longitudinal extension of each tab 24. Advantageously, the stop elements 23 limit the deflection of the movable flap of which the pivot pin is received in the respective bearing.

Figure 4:
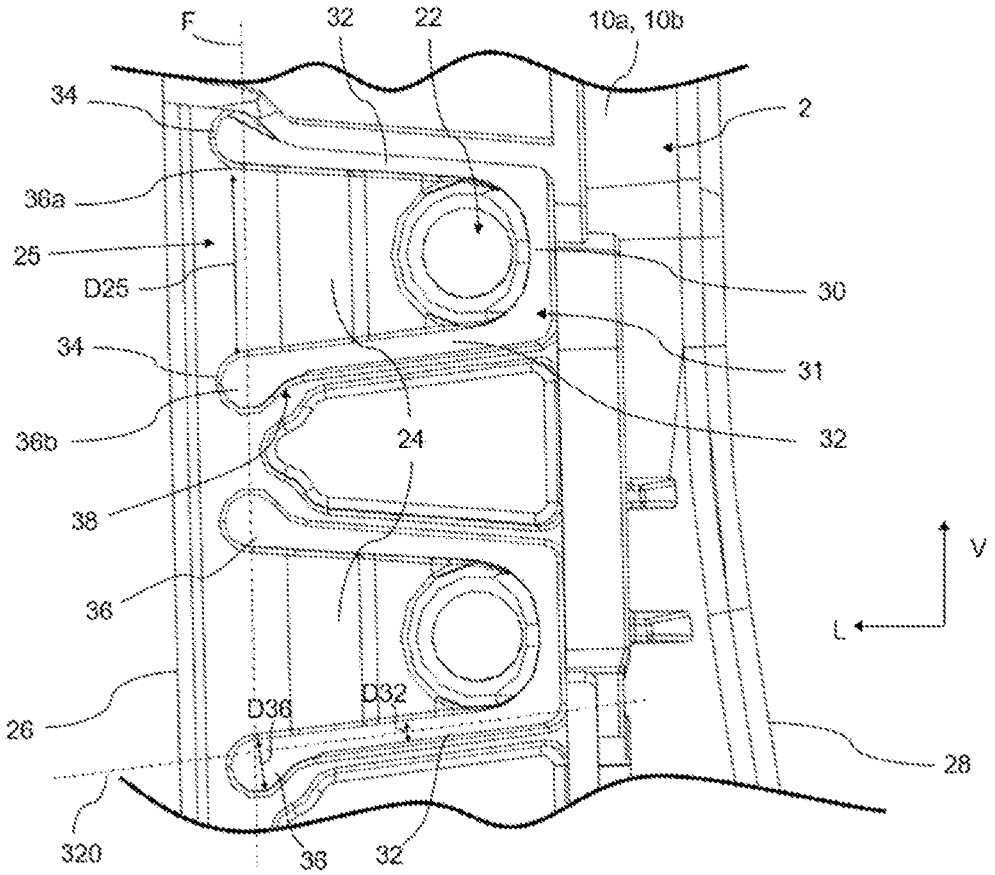
FIG. 4 is a side view of the frame from FIG. 3, showing more particularly the flexible tabs of the frame.
Figure 5:
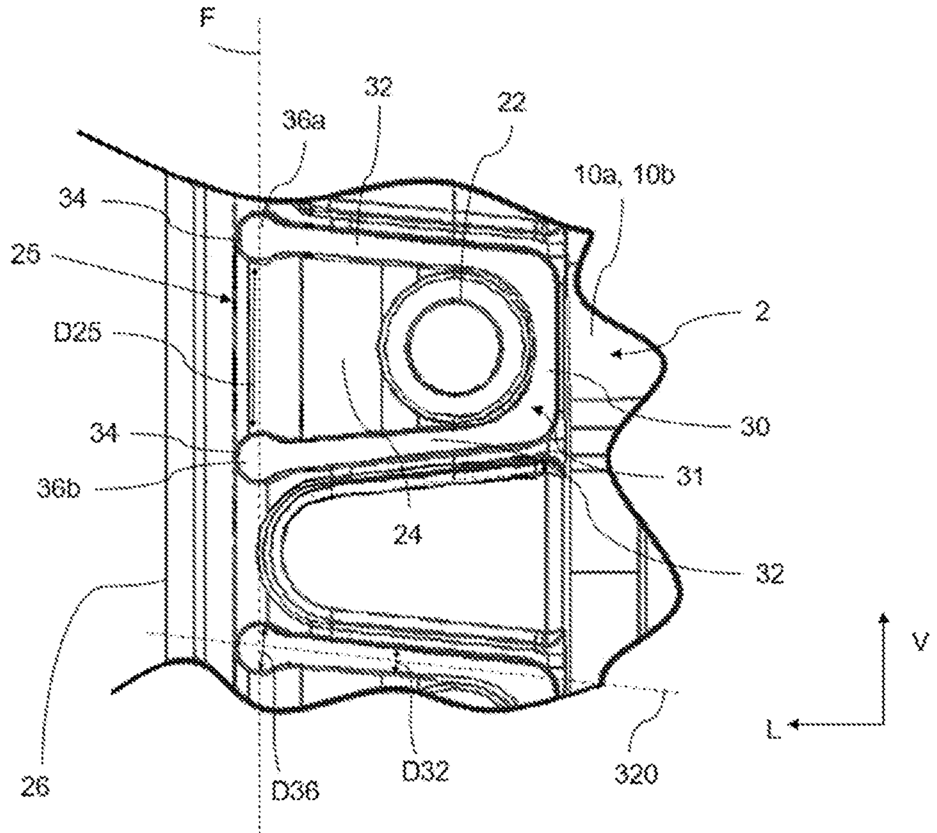
FIG. 5 is a side view similar to that of FIG. 4, illustrating a variant embodiment of the invention.

According to the invention and as shown more clearly on FIGS. 3 to 5, the groove 31 has a U-shape with a base 30 and two arms 32 which extend from the base 30. The base 30 of the groove 31 helps define the form of the second end 242 of the tab, and the free ends 34 of the arms 32 help form the hinge 25 and the first end 241 of the groove. In this way and as mentioned above, the base 30 of the groove is arranged close to the front longitudinal edge 28 of the outer vertical wall 10*a*, 10*b*, and the arms 32 extend from the base 30 in the direction of the rear longitudinal edge 26 of the outer vertical wall 10*a*, 10*b*. The base 30 of the groove 31 is here arranged substantially vertically and the arms extend largely longitudinally. As illustrated, the arms 32 extend in the direction of the rear longitudinal edge 26 and form a widening, i.e. they move apart from one another as they draw closer to the rear longitudinal edge 26 of the outer vertical wall 10*a*, 10*b*.

The free end 34 of each of the arms 32 is close to the rear longitudinal edge 26 of the outer vertical wall 10*a*, 10*b* without being in contact therewith, such that material is present between the free end of the arms and the rear longitudinal edge 26, the groove 31 not being open on the rear longitudinal edge 26.

Also, the groove 31 passes from one side to the other of the outer vertical wall 10*a*, 10*b* along the transverse axis T, i.e. it opens towards the interior of the air intake regulating device 1 and towards the outside thereof.

The tab 24 is movable between the original position and the deformed position by pivoting around a flexion axis F substantially parallel to the vertical axis V, and passing through the free ends 34 of the arms 32 of the groove 31.

As mentioned above, the deformed position of the tab 24 differs from the original position of the tab 24 by a movement of the tab 24 away from the nearest opening zone. In other words, when the tab 24 is in the deformed position, it extends in an alternative plane intersecting the main extension plane of the outer vertical wall 10*a*, 10*b*, the vertical axis V also lying in this alternative plane.

During the elastic deformation of the tab and its positional changes, stresses are mainly exerted on the tab at its base, i.e. at the hinge 25 between the tab and the outer vertical wall of the frame on which the tab is articulated. These stresses are distributed over the edge delimiting the free end.

According to the invention, the groove 31 comprises at least one clearance zone 36 positioned at one of the free ends 34 of the arms 32 of said groove 31. A clearance zone in the sense of the invention comprises a local increase in dimensions of the groove so as to form a protuberance when viewing the groove, or a hollow when viewing the material of the wall in which said groove is made, and in general a local modification of the profile of the edge delimiting the groove.

As shown here, the groove 31 comprises a first clearance zone 36*a* positioned at the free end 34 of one of the arms 32 of the groove 31, and a second clearance zone 36*b* positioned at the free end 34 of the other arm 32 of the groove 31.

These clearance zones 36*a*, 36*b* consist of zones of local increase in dimensions of the groove, taking the form of a water droplet formed at the free end of the corresponding arm of the groove. It should be noted that this local increase is situated at the free ends of the arms of the groove, i.e. at the articulation hinge of the tab, where the deformation stresses exerted on the material of the tab are greatest. In the examples illustrated, the first clearance zone 36*a* and the second clearance zone 36*b* are arranged such that their alignment, defined considering the centre of each of the clearance zones, is congruent or substantially congruent with the axis of flexion F of the tab 24.

The clearance zones are created to increase the extent of the edge delimiting the free end 34 of the arms and thus to enlarge the zone over which the flexion stresses of the tab are exerted. These clearance zones 36*a*, 36*b* thus allow the tab 24 to better absorb deflection stresses due to the positional changes of the tab, and to avoid exceeding an elastic deformation limit of the tab, by optimally distributing the stresses.

The clearance zones 36 axially extend a corresponding arm 32 via a junction zone 38 which has a curved profile. Thus no stress concentration zone is created on deformation by flexion of the tab, smoothing the local increase in dimensions of the groove at its free end.

It should be noted that accordingly, a characteristic described for a clearance zone associated with a groove 31 is also applicable to one or the other of the clearance zones 36*a* and 36*b* of a same groove 31, unless specified otherwise, and also to a single clearance zone 36 of a groove as applicable. The term "clearance zone 36" can thus refer to a clearance zone, a first clearance zone 36*a* and a second clearance zone 36*a*, 36*b*.

The local increase in dimensions of the groove formed by the clearance zone 36 is characterized taking into account a cross-section of the groove in the extension plane of the frame wall on which the tab is articulated, and more particularly a cross-section perpendicular to the main extension direction of the arm 32 of a groove.

As mentioned above, each arm 32 extends the base 30 of the groove 31 in the direction of the rear longitudinal edge 26, extending largely along a substantially longitudinal extension direction by forming a widening by the progressive mutual spacing of the two arms of a same groove.

At least one arm 32 extends along this substantially longitudinal extension direction, being centered on a median extension plane 320 of the arm which is perpendicular to the plane substantially containing the vertical wall 10 on which the corresponding tab 24 is articulated.

As the groove opens transversely on either side of the vertical wall, this groove is mainly characterized by its lateral dimension, namely the dimension in the plane of the substantially vertical wall perpendicular to the median extension plane of the groove. At the arm 32 having said above-mentioned median extension plane 320, the arm has a mean lateral dimension D32, measured in the plane of the vertical wall and perpendicular to the extension plane, of a first predetermined value. According to the invention, it should also be noted that the clearance zone 36 positioned at the free end 34 of this arm 32 has a lateral dimension D36, measured in a similar fashion in the plane perpendicular to this extension plane 320 of the arm, of a second value which is greater than the first value corresponding to the arm.

This second value representative of the lateral dimension D36 of the clearance zone 36 can be substantially equal to twice the first value representative of the mean lateral dimension D32 of the arm 32, at the free end of which the clearance zone is positioned.

As a non-limitative example, the second value of the lateral dimension D36 of the clearance zone 36 can lie between 4 and 6 mm, and the first value representative of the mean lateral dimension D32 of the arm 32 can lie between 2 and 3 mm. In particular, the clearance zone can have a lateral dimension of the order of 5 mm, and the mean lateral dimension of arm can be of the order of 2 mm.

Such dimensions or such a ratio between the lateral dimension of the arm and the lateral dimension of the clearance zone formed at the free end of the arm allows relative quantification of the widening of the groove at its free end so as to allow an appropriate distribution of stresses.

It should also be noted that the local increase in the lateral dimension of the groove, i.e. at the free end of the arms, cannot be achieved to the detriment of the presence of material in the hinge zone, given that it must be ensured that the tab can flex around this hinge without breaking. In this context, the second value representative of the lateral dimension D36 of the clearance zone 36 can be substantially equal to one quarter of the corresponding lateral dimension D25 of the hinge.

As a non-limitative example, the second value of the lateral dimension D36 of the clearance zone 36 can lie between 4 and 6 mm, and the lateral dimension D25 of the hinge can lie between 15 and 25 mm.

As has been explained above, the effect of the clearance zone is to locally increase the dimension of the groove and distribute the stresses exerted on the material by the flexion of the tab. This local increase is also achieved by smoothing out the variations in cross-sections of the groove over the entire periphery of the clearance zone, so as to smooth out the stress gradients. To this end, the protuberance formed by the clearance zone 36 in the plane of the vertical wall of the frame is a circle portion.

According to a first embodiment, here shown in FIG. 4, the clearance zone has an asymmetric profile relative to the median extension plane of the arm. More particularly, the clearance zone is delimited on one side of the extension plane 320 by a first straight portion, i.e. by an edge arranged in the axial extension of the edge delimiting the arm 32 at the free end of which the clearance zone 36 is positioned, and on the other side of this extension plane 320 by a second curved portion which generates the above-mentioned protuberance.

Advantageously and as illustrated, the asymmetric profile of a clearance zone associated with an arm of the groove is such that the protuberance formed on one side of this clearance zone extends opposite the other arm of the groove. Thus the presence of sufficient material between the free ends of the arms of the groove is ensured, and hence a sufficiently large hinge zone to allow appropriate flexion of the tab under the stress of insertion of a movable flap.

According to a variant embodiment illustrated in FIG. 5, the clearance zone 36 has a circular form centered on the median extension plane 320 of the arm, such that it forms two lateral protuberances of the arm 32 which are substantially symmetrical relative to said extension plane.

It should be noted that a groove 31 comprising a first clearance zone 36*a*, as illustrated in FIG. 4, with an asymmetry relative to the median extension plane of the arm carrying said first clearance zone, and a second clearance zone 36*b*, as illustrated on FIG. 5, with a symmetry relative to the median extension plane of the arm carrying said second clearance zone, would still lie within the scope of the invention.

As a reminder, the invention aims to reduce the risk of damage of the tabs 24 when subjected to stresses on mounting of movable flaps on the frame, so as to ensure that the stresses generate only an elastic and not a plastic deformation. Each of the clearance zones 36 formed at the free end of the grooves delimiting the tabs can achieve this objective by increasing the length of the edge defining this free end and thus allowing an increase in the zone on which the flexion stresses are exerted during mounting of the movable flaps 6. Thus the stresses can be distributed over the periphery of these clearance zones 36 while diminishing the stress peaks and the risk of damage of the tabs 24.

The invention is not however limited to the components and configurations described and illustrated here. It also extends to any equivalent components or configurations and to any operative technical combination of such components.

What is claimed is:

1. A frame for an air intake regulating device of a vehicle, the frame comprising:

two walls defining an opening zone for receiving a set of movable flaps arranged parallel to one another, at least one movable flap of the set of movable flaps being movable in rotation about at least one pivot axis, at least one bearing formed by an elastically deformable tab, the at least one bearing being configured to receive a pin defining the pivot axis of the at least one movable flap, wherein the elastically deformable tab is circumscribed in one wall of said two walls of the frame by a U-shaped groove extending through a thickness of the one wall of said two walls, wherein the U-shaped groove includes a base and two arms, each arm respectively extending an end of the base, each of the two arms having a free end opposite the base, wherein the U-shaped groove includes at least one clearance zone positioned at one of the free ends of the two arms of said U-shaped groove, said at least one clearance zone laterally extending the corresponding arm of the two arms while forming at least one protuberance.

2. The frame as claimed in claim 1, wherein the elastically deformable tab is movable around a hinge arranged between the free ends of the two arms of the groove.

3. The frame as claimed in claim 1, wherein at least one of the two arms extends axially in a median extension plane of the arm, said at least one arm having a mean lateral dimension perpendicular to the medium extension plane of a first determined value, wherein the at least one clearance zone positioned at the free end of said at least one arm has a lateral dimension perpendicular to said median extension plane of a second value greater than said first determined value.

4. The frame as claimed in claim 3, wherein the at least one clearance zone is centered on the median extension plane of the said at least one arm, forming two lateral protuberances of said at least one arm which are symmetrical relative to said extension plane.

5. The frame as claimed in claim 3, wherein the at least one clearance zone has an asymmetric profile relative to the median extension plane of said at least one arm, the at least one protuberance extending from the free end of the corresponding arm opposite the other arm of the groove.

6. The frame as claimed in claim 3, wherein the second value representative of the lateral dimension of the at least one clearance zone is equal to twice the first determined value representative of the mean lateral dimension of the arm, at the free end of which the at least one clearance zone is positioned, and equal to one quarter of the corresponding lateral dimension of the hinge.

7. The frame as claimed in claim 1, wherein the at least one clearance zone axially extends the corresponding arm via a junction zone of curved profile.

8. The frame as claimed in claim 1, wherein the profile of the at least one protuberance formed by the at least one clearance zone in the plane of the wall of the frame is a circle portion.

9. The frame as claimed in claim 1, wherein the groove at least one clearance zone includes a first clearance zone positioned at the end of one of the arms of the groove, and a second clearance zone positioned at the end of the other arm of the groove, the two clearance zones being symmetrical to one another relative to a median extension plane of the tab, perpendicular to the plane in which the corresponding frame wall extends.

10. A device for regulating the air intake of a vehicle, comprising:

a frame including two walls defining an opening zone for receiving a set of movable flaps arranged parallel to one another, at least one movable flap of the set of movable flaps being movable in rotation about at least one pivot axis, at least one bearing formed by an elastically deformable tab, the at least one bearing being configured to receive a pin defining the pivot axis of the at least one movable flap, the tab being circumscribed in one wall of said two walls of the frame by a U-shaped groove, the U-shaped groove including a base and two arms, each arm respectively extending an end of the base, each of the arms having a free end opposite the base, wherein the U-shaped groove includes at least one clearance zone positioned at one of the free ends of the two arms of said U-shaped groove, said at least one clearance zone laterally extending the corresponding arm while forming at least one protuberance.

11. The frame as claimed in claim 3, wherein the second value representative of the lateral dimension of the at least one clearance zone is equal to twice the first value representative of the mean lateral dimension of the arm, at the free end of which the clearance zone is positioned, or equal to one quarter of the corresponding lateral dimension of the hinge.

12. The device as claimed in claim 10, wherein the tab is circumscribed in one of said walls of the frame by a U-shaped groove extending through a thickness of the wall.

13. The device as claimed in claim 10, wherein the at least one clearance zone has an asymmetric profile relative to a median extension plane of the at least one arm, the at least one protuberance extending from the free end of a corresponding arm opposite the other arm of the groove.

14. The device as claimed in claim 10, wherein at least one of the two arms extends axially in a median extension plane of the arm, said at least one arm having a mean lateral dimension perpendicular to the medium extension plane of a first determined value, wherein the at least one clearance zone positioned at the free end of said at least one arm has a lateral dimension perpendicular to said median extension plane of a second value greater than said first determined value.

15. The device as claimed in claim 10, wherein the at least one clearance zone is centered on a median extension plane of the at least one arm, forming two lateral protuberances of the at least one arm which are symmetrical relative to the extension plane.

16. A frame for an air intake regulating device of a vehicle, the frame comprising:

two walls defining an opening zone for receiving a set of movable flaps arranged parallel to one another, at least one movable flap of the set of movable flaps being movable in rotation about at least one pivot axis, at least one bearing formed by an elastically deformable tab, the at least one bearing being configured to receive a pin defining the pivot axis of the at least one movable flap, the elastically deformable tab being circumscribed in one wall of said two walls of the frame by a U-shaped groove extending through a thickness of the one wall of said walls.

17. The frame as claimed in claim 16, wherein the groove includes a base and two arms respectively extending ends of the base, each of the arms having a free end opposite the base, wherein the groove includes at least one clearance zone positioned at one of the free ends of the arms of the groove.

18. The frame as claimed in claim 17, wherein the at least one clearance zone laterally extends a corresponding arm while forming at least one protuberance.

19. The frame as claimed in claim 16, wherein at least one of the two arms extends axially in a median extension plane of the arm, said at least one arm having a mean lateral dimension perpendicular to the medium extension plane of a first determined value, wherein the at least one clearance zone positioned at the free end of said at least one arm has a lateral dimension perpendicular to said median extension plane of a second value greater than said first determined value.

20. The frame as claimed in claim 16, wherein the frame includes at least one stop element formed by a transverse protrusion of the vertical wall, the at least one stop element configured to limit the deflection of the at least one movable flap.

* * * * *